US009133066B2

(12) United States Patent
Jung et al.

(10) Patent No.: US 9,133,066 B2
(45) Date of Patent: Sep. 15, 2015

(54) FUNCTIONAL FERTILIZER COMPOSITION INCLUDING NATURAL MINERAL INGREDIENTS AND METHOD OF PREPARING THE SAME

(71) Applicant: DAE YOUNG FERTILIZER CO.,LTD., Anseong-si, Gyeonggi-do (KR)

(72) Inventors: Soon-Duck Jung, Seoul (KR); Sug-Gun Jung, Seoul (KR)

(*) Notice: Subject to any disclaimer, the term of this patent is extended or adjusted under 35 U.S.C. 154(b) by 0 days.

(21) Appl. No.: 13/895,637

(22) Filed: May 16, 2013

(65) Prior Publication Data

US 2013/0247631 A1 Sep. 26, 2013

Related U.S. Application Data (63) Continuation of application No. PCT/KR2011/008172, filed on Oct. 31, 2011.

(30) Foreign Application Priority Data

Dec. 17, 2010 (KR) .................. 10-2010-0129834

(51) Int. Cl.
| | |
|---|---|
| C05C 3/00 | (2006.01) |
| C05C 1/00 | (2006.01) |
| C05D 9/00 | (2006.01) |
| C05G 3/00 | (2006.01) |
| C05B 17/02 | (2006.01) |
| C05G 3/04 | (2006.01) |
| C09K 17/12 | (2006.01) |

(52) U.S. Cl.
CPC . *C05C 3/00* (2013.01); *C05B 17/02* (2013.01); *C05C 1/00* (2013.01); *C05D 9/00* (2013.01); *C05G 3/0064* (2013.01); *C05G 3/04* (2013.01); *C09K 17/12* (2013.01)

(58) Field of Classification Search
CPC .............. C05C 3/00; C05C 1/00; C05G 3/04; C05B 17/02; C05D 9/00; C05D 9/02
USPC ....................................................... 71/31–63
See application file for complete search history.

(56) References Cited

U.S. PATENT DOCUMENTS

| | | | | |
|---|---|---|---|---|
| 3,650,704 A | * | 3/1972 | Kumura et al. ............ 423/415.1 |
| 2013/0247631 A1 | * | 9/2013 | Jung et al. ..................... 71/36 |

FOREIGN PATENT DOCUMENTS

| | | | | | |
|---|---|---|---|---|---|
| CN | 101723723 A | * | 6/2010 | ............... | C05G 1/00 |
| JP | 7-64665 B2 | | 7/1995 | | |
| JP | 8-9772 A | | 1/1996 | | |
| KR | 2002-0045134 A | | 6/2006 | | |
| KR | 10-0979931 B1 | | 9/2010 | | |
| WO | WO 2009003709 A1 | * | 1/2009 | | |

OTHER PUBLICATIONS

International Search Report (PCT/KR2011/008172), WIPO, May 18, 2012.

* cited by examiner

*Primary Examiner* — Jennifer A Smith
(74) *Attorney, Agent, or Firm* — Park & Associates IP Law, P.C.

(57) ABSTRACT

A functional fertilizer composition containing natural mineral ingredients and a method of preparing the same are disclosed. More particularly, a functional fertilizer composition that is environmentally friendly, significantly accelerates growth of plants, relieves physiological disorders, is suitable for use as an agent for odor removal and a gas generation inhibitor, and enables preparation of a soil conditioner from a residue from which mineral ingredients are extracted and a method of preparing the same are disclosed. To this end, the method includes pulverizing vermiculite, mixing the pulverized vermiculite with water, adding sulfur or sulfuric acid to the mixture of pulverized vermiculite and water, stirring the mixture to which sulfur or sulfuric acid has been added, aging the stirred mixture to prepare an aqueous solution, and separating and extracting an aqueous solution containing mineral ingredients from the prepared aqueous solution.

4 Claims, 5 Drawing Sheets

FUNCTIONAL FERTILIZER COMPOSITION INCLUDING NATURAL MINERAL INGREDIENTS AND METHOD OF PREPARING THE SAME

REFERENCE TO RELATED APPLICATIONS

This is a continuation of pending International Patent Application PCT/KR2011/008172 filed on Oct. 31, 2011, which designates the United States and claims priority of Korean Patent Application No. 10-2010-0129834 filed on Dec. 17, 2010, the entire contents of which are incorporated herein by reference.

FIELD OF THE INVENTION

The present invention relates to a functional fertilizer composition including natural mineral ingredients and a method of preparing the same, and more particularly to a functional fertilizer composition that is environmentally friendly, significantly accelerates growth of plants, relieves physiological disorders, may be used as an agent for odor removal and a gas generation inhibitor, and enables preparation of a soil conditioner from a residue from which the mineral ingredients are extracted and a method of preparing the same.

BACKGROUND OF THE INVENTION

Minerals in soil are washed away by groundwater and streams due to eluviation or the like by meteorological phenomena such as snow and rain. In addition, soil minerals are running out due to continuous cultivation of crops in limited sites and thus the yield of crops and the amount of nutrients in crops gradually decrease as time elapses.

Among the soil minerals, small amounts of trace elements are needed by plants. However, when balance among the trace mineral elements is broken or any one thereof is deficient in a considerable amount, crops suffer physiological disorders. The physiological disorders are not easily remedied and, consequently, massive economic losses occur due to inhibition of plant growth.

To address these problems, artificial supplements are applied to mineral deficient soils. Such supplements are referred to as fertilizers.

Thanks to recent development of chemical fertilizers, chemical fertilizers are generally used on croplands, such as rice fields, dry fields, green houses, and the like. When a chemical fertilizer is used, crop yield increases, whereas soil acidification is caused and, if used for extended periods of time, soil fertility is deteriorated.

To address these problems of chemical fertilizers, use of organic fertilizers is recommended. When the organic fertilizer is used, however, a production process thereof is complicated and it is labor consuming. Thus, general farmhouses mainly use organic composts that are commercially available.

Organic compost manufacturers are mainly manufacturing and selling non-fermented compost using sawdust. When non-fermented compost is used, however, odors are caused by gas, such as ammonia gas or the like, generated after the non-fermented compost is applied, and crops cannot be grown. Thus, farmhouses are unwilling to use commercially available organic composts.

In addition, these days, an organic fertilizer manufactured by mixing used briquettes, sawdust and the like with livestock wastes and fermenting the mixture is commercially available. When the organic fertilizer using livestock wastes is used, however, odors occur when spraying the organic fertilizer and supply of minerals is still deficient in spite of supply of a large amount of organic substances, and thus, it is impossible to efficiently absorb various ingredients needed for growth of plants.

Meanwhile, plants absorb various elements based on the least abundant element among all absorbable elements according to Liebig's Law of the Minimum. In this regard, in a case in which mineral ingredients, which are trace elements, are deficient, even though a large amount of an organic fertilizer containing nitrogen, phosphorus, potassium, and the like is supplied, it only accelerates soil acidification and various necessary ingredients for growth may not be efficiently absorbed. Therefore, to grow plants, it is necessary to continuously supply mineral ingredients as well as organic ingredients.

Currently, research on fertilizers that may effectively supply these mineral ingredients is intensively conducted in the field of agriculture and gardening. In addition, single salts such as silicates and the like are mainly used as the mineral ingredients supplied to plants, and are generally used in an aqueous solution state.

When various mixed minerals needed for plants are prepared by mixing these single salts, however, preparation thereof is difficult due to reactions such as agglomeration, precipitation, or the like. In addition, when mineral ingredients are prepared by mixing chemically prepared single salts, it is very difficult to prepare a fertilizer containing various mineral ingredients needed for plants. Furthermore, when chemically prepared mineral ingredients are accumulated in soil, the single ingredients are concentrated therein and thus may adversely affect plants.

SUMMARY OF THE INVENTION

Therefore, the present invention has been made in view of the above problems, and it is an object of the present invention to provide a functional fertilizer composition that is environmentally friendly, may relieve physiological disorders of crops, and may significantly accelerate growth of plants, and a method of preparing the same.

It is another object of the present invention to provide a functional fertilizer composition for removal of odors and ammonia gas generated from livestock wastes and an organic fertilizer and a method of preparing the same.

It is another object of the present invention to provide a functional fertilizer composition which contains vermiculite having a cation exchange capability to supply minerals so as to grow crops in balance and thus improves vitality of plant roots, naturally keeps plants in a healthy state, enables crops to have high sugar content and to produce good color of fruits due to excellent photosynthesis, provides solid fruits, and has an excellent effect on prevention of diseases and insect pests and a method of preparing the same.

It is a further object of the present invention to provide a functional fertilizer composition containing a variety of mineral ingredients needed for plants, a method of preparing the same, and a soil conditioner prepared from a residue remaining after preparation of the functional fertilizer composition without disposal thereof.

In accordance with an aspect of the present invention, the above and other objects can be accomplished by the provision of a method of preparing a functional fertilizer composition containing natural mineral ingredients, the method including pulverizing vermiculite (operation S11), mixing the pulverized vermiculite with water (operation S12), adding sulfur or sulfuric acid to the mixture of pulverized vermiculite and water (operation S13), stirring the mixture to which sulfur or sulfuric acid has been added (operation S14), aging the stirred mixture (operation S15), and separating and extracting an aqueous solution containing mineral ingredients from the aged mixture (operation S16).

The method may further include mixing at least one additive selected from the group consisting of ammonium molybdate, copper sulfate, borax or boric acid, manganese sulfate, zinc sulfate, and magnesium sulfate with water (operation S21) after the separating and extracting (operation S16) and adding the separated and extracted aqueous solution containing mineral ingredients to the mixture of the additive and water and mixing, stirring and aging the resulting solution (operation S22).

The method may further include mixing at least one additional fertilizer composition selected from the group consisting of borax or boric acid, magnesium sulfate, zinc sulfate, potassium phosphate, potassium nitrate, sodium metaphosphate, distilled water, ammonium nitrate, and urea with water (operation S31) after the adding of the separated and extracted aqueous solution (operation S22) and adding the aged mixture of the mixture of the additive and water and the separated and extracted aqueous solution containing mineral ingredients to the mixture of the additional fertilizer composition and water, and mixing, stirring and aging the resulting mixture (operation S32).

The adding of the separated and extracted aqueous solution (operation S22) may be performed at a temperature ranging from 1 to 100° C.

The mixture of pulverized vermiculite and water may include 10 to 70 parts by weight of vermiculite and 50 to 120 parts by weight of water, and 1 to 30 parts by weight of sulfur or sulfuric acid may be added to 50 to 120 parts by weight of the mixture of pulverized vermiculite and water.

In accordance with another aspect of the present invention, there is provided a functional fertilizer composition containing natural mineral ingredients and prepared using the above-described method, the functional fertilizer composition including the natural mineral ingredients extracted from a mixture of pulverized vermiculite, water, and sulfuric acid.

In accordance with another aspect of the present invention, there is provided a functional fertilizer composition containing natural mineral ingredients and prepared using the above-described method, the functional fertilizer composition including the natural mineral ingredients extracted from a mixture of pulverized vermiculite, water, sulfuric acid, and at least one additive selected from the group consisting of ammonium molybdate, copper sulfate, borax or boric acid, manganese sulfate, zinc sulfate, and magnesium sulfate.

In accordance with another aspect of the present invention, there is provided a functional fertilizer composition containing natural mineral ingredients and prepared using the above-described method, the functional fertilizer composition including an organic component and the natural mineral ingredients extracted from a mixture of pulverized vermiculite, water, sulfuric acid, at least one additive selected from the group consisting of ammonium molybdate, copper sulfate, borax or boric acid, manganese sulfate, zinc sulfate, and magnesium sulfate, and at least one additional fertilizer composition selected from the group consisting of borax or boric acid, magnesium sulfate, zinc sulfate, potassium phosphate, potassium nitrate, sodium metaphosphate, distilled water, ammonium nitrate, and urea.

In accordance with another aspect of the present invention, there is provided a method of preparing a soil conditioner containing natural mineral ingredients, the method including: drying a residue mixture remaining after preparation of the functional fertilizer composition containing natural mineral ingredients using the above-described method and from which the aqueous solution containing mineral ingredients is extracted (operation S41), immersing the dried mixture in water at 1 to 100° C. (operation S42), and air-drying the immersed mixture and mixing the air-dried mixture with each of the functional fertilizer compositions containing natural mineral ingredients (operation S43), wherein operations 42 and 43 are repeated at least once.

In accordance with another aspect of the present invention, there is provided a soil conditioner prepared using the method of preparing a soil conditioner containing natural mineral ingredients, the soil conditioner including the functional fertilizer composition containing natural mineral ingredients and a residue mixture from which the aqueous solution containing mineral ingredients is extracted.

According to the present invention, there is provided a functional fertilizer composition that is environmentally friendly, may significantly accelerate growth of plants, may be readily fertilized as desired by farmhouses, and may reduce the amounts of a chemical fertilizer and an organic fertilizer used.

In addition, the functional fertilizer composition may restore the fertility of soil and thus enables crops to be resistant to various viruses, which results in reduction in amount of agrochemicals used, and may reduce environmental damage according to use of agrochemicals.

Moreover, a residue remaining after preparation of the functional fertilizer composition may be reused as a soil conditioner and thus the functional fertilizer composition may prevent environmental pollution due to disposal of the residue, and may prevent soil acidification to aid growth of crops.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Reference will now be made in detail to the preferred embodiments of the present invention, examples of which are illustrated in the accompanying drawings. First of all, terminology used in this specification and claims should not be construed as limited to the dictionary meanings thereof and should be interpreted as having meanings and concepts matching the technical spirit of the present invention based on the principle that an inventor is able to appropriately define the concepts of the terminologies to describe the invention in the best way possible. The embodiment disclosed herein and configurations shown in the accompanying drawings are only one preferred embodiment and do not represent the full technical scope of the present invention. Therefore, it is to be understood that the present invention covers a variety of equivalents and modifications of the technical subject matters of the invention when this application was filed.

According to an embodiment of the present invention, a method of preparing a functional fertilizer composition including natural mineral ingredients includes pulverizing vermiculite (operation S11), mixing the pulverized vermiculite with water (operation S12), adding sulfur or sulfuric acid to the mixture of pulverized vermiculite and water (operation S13), stirring the mixture to which sulfur or sulfuric acid has been added (operation S14), aging the stirred mixture (operation S15), and separating and extracting an aqueous solution containing mineral ingredients from the aged mixture (operation S16).

In addition, the method further includes mixing at least one additive selected from the group consisting of ammonium molybdate, copper sulfate, borax or boric acid, manganese sulfate, zinc sulfate, and magnesium sulfate with water (operation S21) after separation and extraction of the aqueous solution containing mineral ingredients from the aged mixture (operation S16), and adding the separated and extracted aqueous solution containing mineral ingredients to the mixture of the additive and water and mixing, stirring and aging the resulting mixture (operation S22).

In addition, the method may further include mixing at least one additional fertilizer composition selected from the group consisting of borax or boric acid, magnesium sulfate, zinc sulfate, potassium phosphate, potassium nitrate, sodium metaphosphate, distilled water, ammonium nitrate, and urea with water (operation S31) after the adding of the separated and extracted aqueous solution containing mineral ingredients to the mixture of the additive and water and the mixing, stirring and aging of the resulting mixture (operation S22), and adding the aged mixture of the mixture of the additive and water and the separated and extracted aqueous solution containing mineral ingredients to the mixture of the additional fertilizer composition and water, and mixing, stirring and aging the resultant mixture (operation S32).

In addition, the adding of the separated and extracted aqueous solution containing mineral ingredients to the mixture of the additive and water and the mixing, stirring and aging of the resulting mixture (operation S22) may be performed at a temperature ranging from 1 to 100° C.

In addition, the mixture of vermiculite and water may include 10 to 70 parts by weight of vermiculite and 50 to 120 parts by weight of water, and 1 to 30 parts by weight of the sulfur or sulfuric acid may be added to 50 to 120 parts by weight of the mixture of vermiculite and water.

In the method for preparing a functional fertilizer composition including natural mineral ingredients, a functional fertilizer composition prepared thereby includes natural mineral ingredients extracted from a mixture of pulverized vermiculite, water, and sulfuric acid.

According to another embodiment of the present invention, a functional fertilizer composition containing natural mineral ingredients and prepared using the method for preparing a functional fertilizer composition including natural mineral ingredients includes natural mineral ingredients extracted from a mixture of pulverized vermiculite, water, sulfuric acid, and at least one additive selected from the group consisting of ammonium molybdate, copper sulfate, borax or boric acid, manganese sulfate, zinc sulfate, and magnesium sulfate.

According to another embodiment of the present invention, a functional fertilizer composition containing natural mineral ingredients and prepared using the method for preparing a functional fertilizer composition including natural mineral ingredients includes an organic component and natural mineral ingredients extracted from a mixture containing pulverized vermiculite, water, sulfuric acid, at least one additive selected from the group consisting of ammonium molybdate, copper sulfate, borax or boric acid, manganese sulfate, zinc sulfate, and magnesium sulfate, and at least one additional fertilizer composition selected from the group consisting of borax or boric acid, magnesium sulfate, zinc sulfate, potassium phosphate, potassium nitrate, sodium metaphosphate, distilled water, ammonium nitrate, and urea.

According to another embodiment of the present invention, a method of preparing a soil conditioner includes drying a residue mixture remaining after preparation of a functional fertilizer composition including natural mineral ingredients using the above-described method and from which the aqueous solution containing mineral ingredients is extracted (operation S41), immersing the dried mixture in water at 1 to 100° C. (operation S42), and air-drying the immersed mixture and mixing the air-dried mixture with each of the prepared functional fertilizer compositions containing natural mineral ingredients (operation S43), wherein operations S42 and S43 are repeated at least once.

According to another embodiment of the present invention, a soil conditioner prepared using the method of preparing a soil conditioner containing natural mineral ingredients includes the functional fertilizer composition containing natural mineral ingredients and a residue mixture through which the aqueous solution containing mineral ingredients is extracted.

Figure 1:
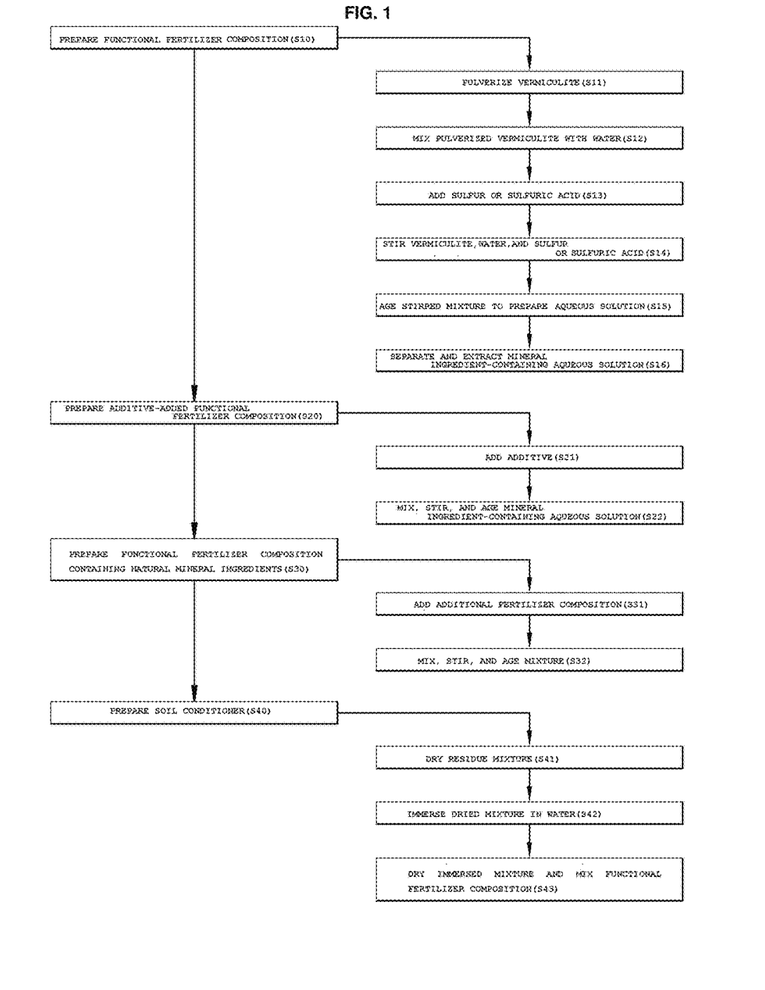
FIG. 1 is a flowchart for explaining a method of preparing a functional fertilizer composition containing natural mineral ingredients, according to an embodiment of the present invention.

Hereinafter, the present invention will be described with reference to the accompanying drawings. As illustrated in FIG. 1, a method of preparing a functional fertilizer composition containing natural mineral ingredients includes preparing a functional fertilizer composition including a mineral ingredient-containing aqueous solution made from vermiculite, sulfur or sulfuric acid, and water (operation S10), preparing an additive-added functional fertilizer composition by mixing the mineral ingredient-containing aqueous solution with an additive (operation S20), preparing a final functional fertilizer composition containing natural mineral ingredients by mixing the additive-added functional fertilizer composition with an additional fertilizer composition (operation S30), and preparing a soil conditioner by preparing a soil enhancement mixture using a residue mixture remaining after preparation of the functional fertilizer composition containing natural mineral ingredients and from which the mineral ingredient-containing aqueous solution is extracted and mixing the soil enhancement mixture with the functional fertilizer composition containing natural mineral ingredients (operation S40).

First, the preparing of the functional fertilizer composition including a mineral ingredient-containing aqueous solution (operation S10) includes pulverizing vermiculite (operation S11), mixing the pulverized vermiculite with water (operation S12), adding sulfur or sulfuric acid to the mixture of pulverized vermiculite and water (operation S13), stirring the mixture to which the sulfur or sulfuric acid has been added (operation S14), aging the stirred mixture (operation S15), and separating and extracting the mineral ingredient-containing aqueous solution from the aged mixture (operation S16).

In detail, first, to extract mineral ingredients from vermiculite, the vermiculite is pulverized (operation S11). In this regard, a particle size of the pulverized vermiculite is not limited. The term "vermiculite" as used herein refers to a mineral that belongs to a monoclinic system having the same crystal structure as that of mica. Vermiculite is light gray or brown, is easily decomposed by acid, has a high cation exchange capability, and expands by heating. The vermiculite has chemical components of CMg, $Fe^{3+}$, and $Al3(Al,Si)4O10(OH)2.4H2O$, and is a clay mineral consisting of silicate hydroxide of Al.Mg.Fe. Thus, when the vermiculite is decomposed by acid, e.g., sulfuric acid or the like, mineral ingredients, such as Al, Mg, Fe, Si, and the like may be extracted from the components of the vermiculite.

Next, the pulverized vermiculite is mixed with water, to extract mineral ingredients from the mixture containing the pulverized vermiculite (operation S12). In this regard, 10 to 70 parts by weight of the pulverized vermiculite is mixed with 50 to 120 parts by weight of water. This is because efficiency is deteriorated when the amount of the pulverized vermiculite is less than 10 parts by weight, and it is difficult to extract mineral ingredients when the amount of the pulverized vermiculite is greater than 70 parts by weight.

After the mixing of the pulverized vermiculite with water (operation S12), sulfur or sulfuric acid is added to the mixture of pulverized vermiculite and water (operation S13). In this regard, 1 to 30 parts by weight of sulfur or sulfuric acid may be added to 50 to 120 parts by weight of the mixture of pulverized vermiculite and water. The amounts of the sulfur or sulfuric acid and the mixture of pulverized vermiculite and water may vary according to other characteristics.

Thereafter, the mixture to which sulfur or sulfuric acid is added is stirred (operation S14), followed by aging of the stirred mixture while maintaining a temperature of the mixture at 1 to 100° C. (operation S15). In this regard, the stirring and aging of the mixture may be performed for 0.5 hours or longer, but stirring and aging time is not limited thereto.

In addition, the temperature of the mixture is maintained at 1 to 100° C. during stirring and aging because mineral ingredients are most satisfactorily extracted within this range. Even though preparation processes are performed by somewhat varying the above-described time or temperature or time or temperature which will be described below with regards to other preparation steps, such time or temperature range is not particularly limited so long as the preparation processes may be smoothly performed.

By adding sulfur or sulfuric acid to the mixture of pulverized vermiculite and water and stirring and aging the resulting mixture, an aqueous solution may be prepared. Through these preparation steps, an aqueous solution that enables more complete extraction of mineral ingredients from the mixture may be prepared.

Next, the aqueous solution containing mineral ingredients is separated and extracted from the stirred and aged mixture (operation S16). In this regard, the separation and extraction methods are not limited. For example, various methods, such as filtration of the stirred and aged mixture and removal of waste, and the like may be utilized. The mineral ingredients in the mineral ingredient-containing aqueous solution are derived from vermiculite as a raw material, which is an environmentally friendly, natural material and therefore a variety of natural mineral ingredients may be employed.

Hereinafter, the preparing of the additive-added functional fertilizer composition by mixing the mineral ingredient-containing aqueous solution with an additive (operation S20) will be described in detail. Here, the additive may be at least one composition selected from the group consisting of ammonium molybdate, copper sulfate, borax or boric acid, manganese sulfate, zinc sulfate, and magnesium sulfate.

First, after separation and extraction of the mineral ingredient-containing aqueous solution from the aged mixture (operation S16), at least one additive selected from the group consisting of ammonium molybdate, copper sulfate, borax or boric acid, manganese sulfate, zinc sulfate, and magnesium sulfate is mixed with water (operation S21). Thereafter, the separated and extracted mineral ingredient-containing aqueous solution is added to the mixture of the additive and water, and mixing, stirring and aging the resulting solution (operation S22).

In the mixing of the additive and water (S21), the amount of water mixed may be 50 to 150 parts by weight based on 0.1 to 50 parts by weight of the additive. In the stirring and aging step (operation S22), the amount of the mineral ingredient-containing aqueous solution may be 10 to 50 parts by weight based on 10 to 120 parts by weight of the mixture of the additive and water.

Here, ammonium molybdate is an achromatic, pillar-shaped crystal, is obtained by dissolving molybdenum trioxide in ammonium hydroxide and evaporating the resulting solution, and is used as a raw material of functional health foods and fertilizers.

Copper sulfate is a sulfate of copper and has two types: copper (I) sulfate and copper (II) sulfate. Both types thereof may be used.

Boric acid is an oxoacid generated by hydration of boron oxide, and collectively refers to orthoboric acid, metaboric acid, tetraborate, and the like. Boric acid is water-soluble and thus is easily mixed with a mixture of the extracted mineral ingredient and water.

Borax consists of colorless crystals or a white crystalline powder, is odorless, tastes slightly salty, dissolves in water, and is poorly soluble in ethanol. Borax is used as a local germicide or preservative and has molecular formula $Na_2B_4O_7.10H_2O$.

Manganese sulfate is a colorless solid sulfate of manganese, and is readily mixed with water because it is a water-soluble inorganic compound. Zinc sulfate has molecular formula $ZnSO_4$.

Magnesium sulfate is a sulfate of magnesium, is a white crystalline powder, and is readily mixed with water because it is water-soluble.

By stirring and aging the resulting solution at a temperature ranging from 1 to 100° C. (operation S22) after mixing the at least one additive with water, a functional fertilizer composition containing natural mineral ingredients according to the present invention is obtained. In this regard, the stirring and aging processes may be performed for 0.5 hours or longer, but the stirring and aging time is not limited thereto.

Vermiculite as a raw material of the functional fertilizer composition according to the present invention is an environmentally friendly natural material, and may provide a variety of natural mineral ingredients. In addition, vermiculite exhibits excellent odor removal effects and gas generation inhibitory effects.

Therefore, an aqueous solution containing mineral ingredients extracted from vermiculite or a composition containing a mineral ingredient-containing aqueous solution may be itself used as a fertilizer or as an agent for removal of odors from human waste and a gas generation inhibitor. In addition, when the aqueous solution containing mineral ingredients extracted from vermiculite or the composition containing a mineral ingredient-containing aqueous solution is used together with an organic fertilizer, odors generated from the organic fertilizer are removed and generation of ammonia gas is also inhibited.

In addition, as described above, the aqueous solution containing mineral ingredients extracted from vermiculite may be mixed with water and additives selected from ammonium molybdate, copper sulfate, borax or boric acid, manganese sulfate, zinc sulfate, magnesium sulfate, and the like to prepare a liquid fertilizer. The liquid fertilizer also has odor removal effects and gas generation inhibitory effects and thus may be suitable for use as an agent for odor removal and a gas generation inhibitor.

Moreover, the additive-added functional fertilizer composition prepared by preparation of the additive-added functional fertilizer composition (operation S20) is further mixed with an additional fertilizer composition, thereby preparing a final functional fertilizer composition containing natural mineral ingredients (operation S30).

In this regard, the additional fertilizer composition may be at least one composition selected from the group consisting of borax or boric acid, magnesium sulfate, zinc sulfate, potassium phosphate, potassium nitrate, sodium metaphosphate, distilled water, ammonium nitrate, and urea.

First, after the adding of the separated and extracted mineral ingredient-containing aqueous solution to the mixture of the additive and water and mixing, stirring and aging the resulting solution (operation S22), at least one additional fertilizer composition selected from the group consisting of borax or boric acid, magnesium sulfate, zinc sulfate, potassium phosphate, potassium nitrate, sodium metaphosphate, distilled water, ammonium nitrate, and urea is mixed with water (operation S31). In this regard, the amount of water mixed may be 1 to 80 parts by weight based on 0.1 to 30 parts by weight of the additional fertilizer composition.

Next, 20 to 100 parts by weight of the aged mixture of the mixture of the additive and water and the separated and extracted mineral ingredient-containing aqueous solution, which has been prepared through operation S22, is added to 5 to 100 parts by weight of the mixture of the additional fertilizer composition and water, and the resulting solution is mixed and stirred (operation S32).

In this regard, the additional fertilizer composition may be at least one composition selected from the group consisting of borax or boric acid, magnesium sulfate, zinc sulfate, potassium phosphate, potassium nitrate, sodium metaphosphate, distilled water, ammonium nitrate, and urea. Among the additional fertilizer compositions, borax and boric acid are the same as described above. Magnesium sulfate is a sulfate of magnesium and a white crystalline solid, and is used as a medicine as well as a filler for paper and a mordant. Magnesium sulfate has two types: crystalline and dry. Crystalline magnesium sulfate is used in brewing, for cultivation of chlorella, enzymes, and antibiotics, for feeds, and for medical and pharmaceutical applications. Dry-type magnesium sulfate is used for salting and fermentation and as a desiccant. Crystalline magnesium sulfate consists of colorless pillar or needle shaped crystals and has a salty and bitter taste.

Zinc sulfate is a sulfate of zinc, and is a colorless and water-soluble powder. Potassium phosphate collectively refers to monobasic potassium phosphate, dibasic potassium phosphate, and tribasic potassium phosphate, which have chemical formulae KH2PO4, K2HPO4, K3PO4, respectively.

Potassium nitrate has chemical formula KNO3 and a nitrate of potassium present in the form of colorless pillar-shaped crystal or white crystalline powder. Potassium nitrate may be used as a fertilizer for supply of nitrogen to plants to help growth of the plants and is highly soluble in water.

Sodium metaphosphate is used as a metaphosphate-based texturizer in the form of colorless or white glass-shaped lumps or flakes or white fibrous crystal or powder.

Ammonium nitrate is a salt generated by reaction between nitric acid and ammonia, may be obtained through injection of ammonia gas into a nitric acid solution, and is water-soluble.

Urea is an organic compound having chemical formula CO(NH2)2 and is a colorless crystalline material. In addition, urea, which is the final degradation product of protein metabolism of all mammals and some fish, has a very high content of nitrogen and thus is used as a main raw material of fertilizers.

By mixing the materials used in operations S31 and S32 at the above-described weight ratio and stirring and aging the resulting solution at a temperature ranging from 1 to 100° C. (operations S31 and S32), the functional fertilizer composition containing natural mineral ingredients according to the present invention is obtained. In this regard, the stirring and aging processes of the mixture may be performed for 0.5 hours or longer, but the stirring and aging time is not limited thereto.

In addition, the method of preparing a functional fertilizer composition containing natural mineral ingredients may further include preparing a soil conditioner using a residue remaining after preparation of the mineral ingredient-containing aqueous solution, i.e., operation S10 (operation S40).

First, after separation and extraction of the mineral ingredient-containing aqueous solution (operation S16), a residue mixture remaining after preparation of the functional fertilizer composition containing natural mineral ingredients and from which the mineral ingredient-containing aqueous solution is extracted (i.e., a composition including vermiculite residues remaining after extraction of mineral ingredients, sulfur or sulfuric acid, and water) is dried (operation S41) to remove moisture therefrom. In this regard, the drying method is not particularly limited, and any drying method may be used so long as it enables removal of water.

Next, the dried mixture was immersed in water at a temperature ranging from 1 to 100° C. (operation S42), followed by air-drying of the immersed mixture and mixing of the air-dried mixture with the previously prepared functional fertilizer composition containing natural mineral ingredients (operation S43), thereby completing preparation of the soil conditioner. In this regard, operations S42 and S43 may be performed at least once.

In operation S42, the amount of the dried mixture immersed in water may be 10 to 50 parts by weight based on 30 to 100 parts by weight of water, but is not limited thereto. The immersion time and drying time are also not particularly limited.

In addition, in operation S43, the soil conditioner may be prepared by mixing 50 to 100 parts by weight of the air-dried mixture with 10 to 50 parts by weight of the previously prepared functional fertilizer composition containing natural mineral ingredients. When the amount of the air-dried mixture used is less than 50 parts by weight, the functional fertilizer composition containing natural mineral ingredients is excessively mixed and thus there is a risk of inhibition of crop growth. On the other hand, when the amount of the air-dried mixture used is greater than 100 parts by weight, the amount of the functional fertilizer composition containing natural mineral ingredients is small and thus it may be difficult to obtain growth effects of crops by mineral ingredients.

In addition, when the amount of the functional fertilizer composition containing natural mineral ingredients used is less than 10 parts by weight, it has insignificant effects and thus does not aid crop growth. On the other hand, when the amount of the functional fertilizer composition containing natural mineral ingredients used is greater than 50 parts by weight, the functional fertilizer composition containing natural mineral ingredients may have adverse effects on crops due to excess mineral ingredients.

EXAMPLE 1

375 g of vermiculite and 375 g of water was mixed, 20 g of sulfuric acid was added to 750 g of the mixture, the resulting mixture was stirred, and the stirred mixture was aged at 60 to 65° C. for 5 days to prepare a mineral ingredient-containing aqueous solution. Then, water was removed therefrom and mineral ingredients were extracted therefrom.

Thereafter, 8 g of each of ammonium molybdate, copper sulfate, boric acid, manganese sulfate, zinc sulfate, and magnesium sulfate (total 48 g) was mixed with 100 g of water, 50 g of the extracted mineral ingredients was added to 100 of the mixture, and then the resulting mixture was stirred and aged at 70 to 75° C., thereby completing preparation of an additive-added functional fertilizer composition.

EXAMPLE 2

3 g of each of boric acid, magnesium sulfate, zinc sulfate, potassium phosphate, potassium nitrate, sodium metaphosphate, ammonium nitrate, and urea as additional fertilizer compositions were mixed, 50 g of water was added to a total of 24 g of the additional fertilizer compositions, 50 g of the additive-added functional fertilizer composition prepared according to Example 1 was added to 50 g of the resulting mixture, and the resulting solution was stirred and aged for 5 days. In this regard, a temperature of approximately 70 to 75° C. was maintained. Thereafter, the fertilizer composition prepared according to Example 2 was diluted with water at a weight ratio of 1 g: 250 g to prepare a liquid fertilizer composition.

Figure 2:
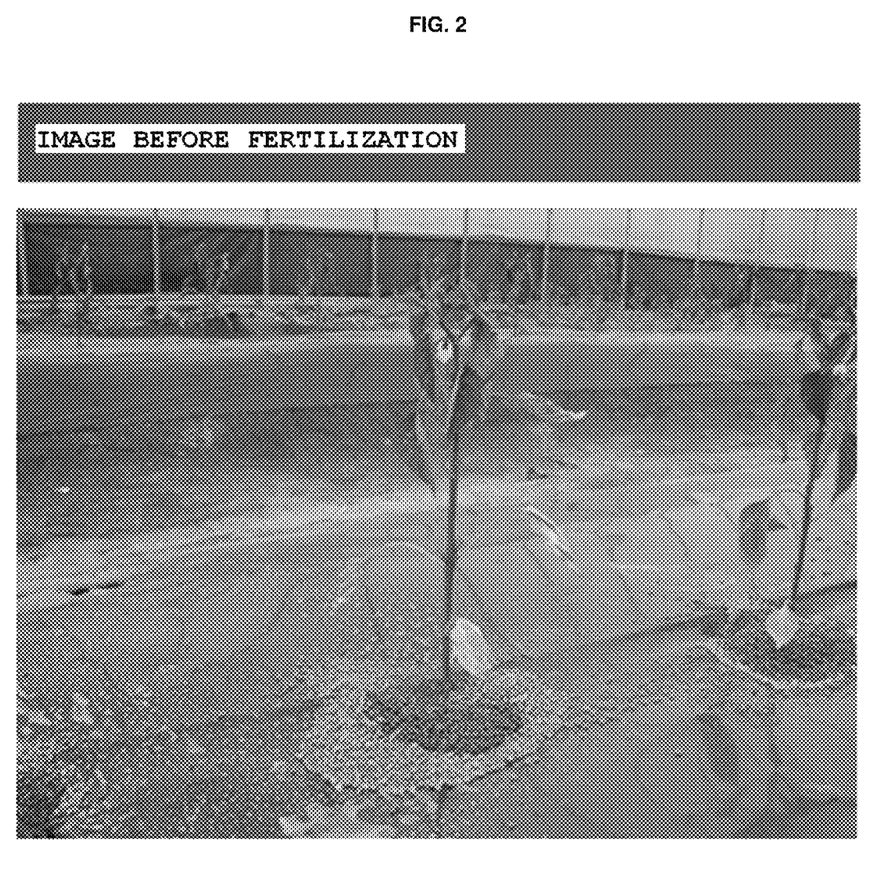
FIG. 2 is a photograph showing conditions of hot peppers before fertilization with a functional fertilizer composition containing natural mineral ingredients according to an embodiment of the present invention.

Hot peppers, with yellowed leaves and suffering slow growth and development, as depicted in FIG. 2, were fertilized with the liquid fertilizer composition. The fertilization process was as follows: primary fertilization with the liquid fertilizer composition and secondary fertilization after 3 days. 7 days after the secondary fertilization, the hot peppers were photographed, and growth conditions of the plant, i.e., a total number of leaves and the number of yellowed leaves, were observed by the naked eye. Results are shown in Table 1 below. As a control, unfertilized hot peppers, at least one fifth of leaves of which were yellow, were used.

TABLE 1

|  | Before fertilization (number of yellow leaves/total number of leaves) | After 3 days (number of yellow leaves/total number of leaves) | After 10 days (number of yellow leaves/total number of leaves) |
|---|---|---|---|
| Control | 5/10 | 7/12 | 9/15 |
| Example 2 | 5/10 | 4/15 | 1/25 |

Figure 3:
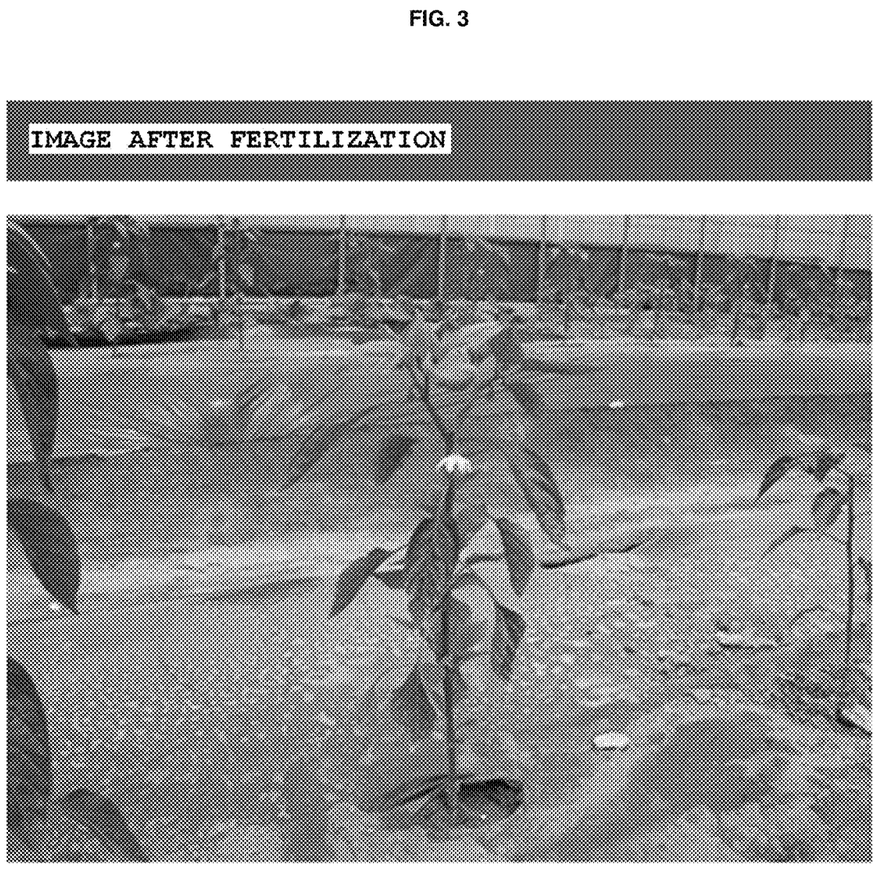
FIG. 3 is a photograph showing good growth conditions of hot peppers after fertilization with the functional fertilizer composition containing natural mineral ingredients according to an embodiment of the present invention.

As shown in Table 1 and illustrated in FIG. 3, growth conditions of the plant 7 days after the second fertilization were significantly improved as compared to those of the plant before fertilization as illustrated in FIG. 2. That is, the number of leaves increased and branches and a central stem were solid. From the results, it was confirmed that the liquid fertilizer composition of Example 2 has a significant effect on the growth of hot peppers.

Figure 4:
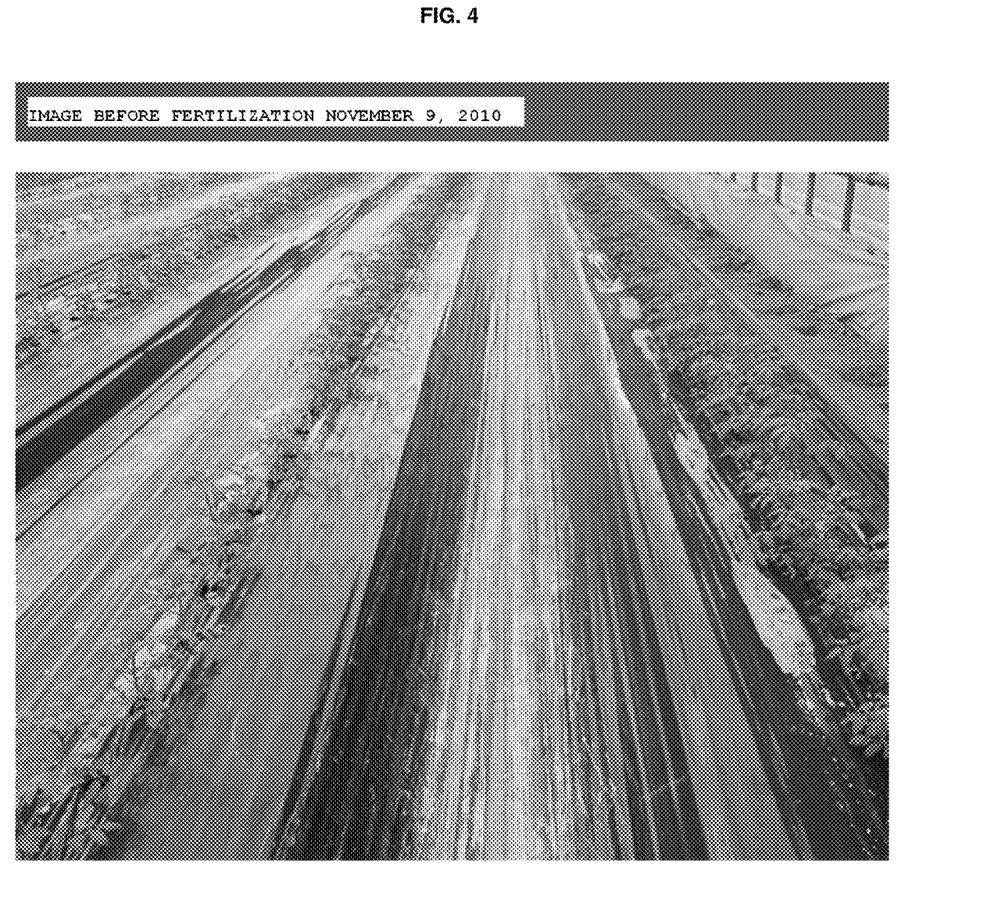
FIG. 4 is a photograph showing conditions of tomatoes before fertilization with a functional fertilizer composition containing natural mineral ingredients according to an embodiment of the present invention.
Figure 5:
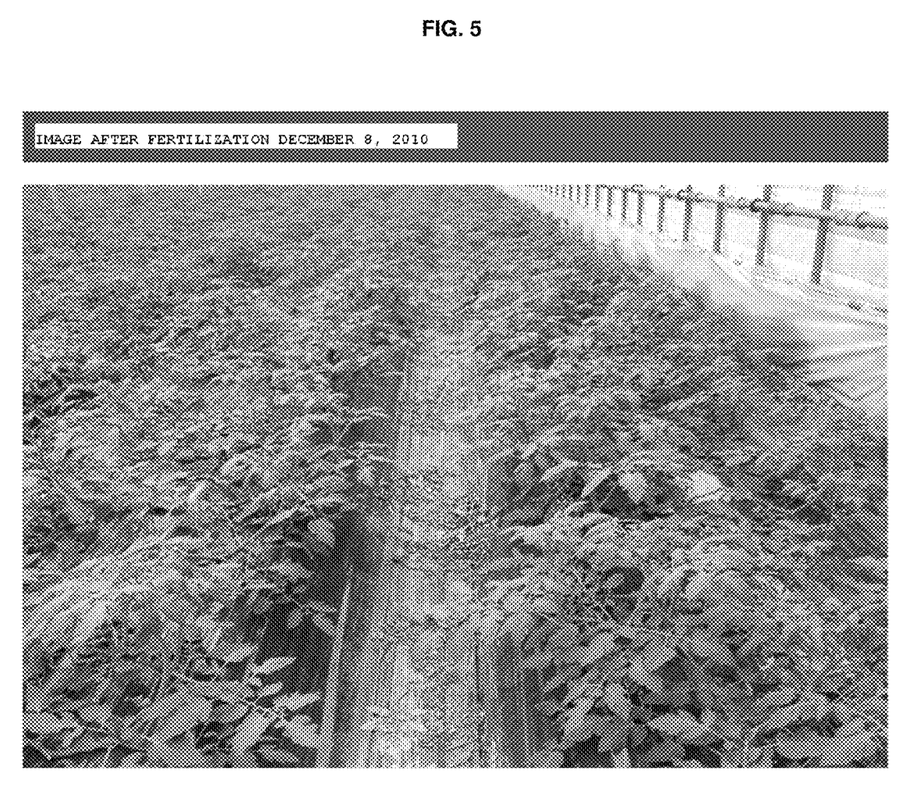
FIG. 5 is a photograph showing good growth conditions of tomatoes after fertilization with the functional fertilizer composition containing natural mineral ingredients according to an embodiment of the present invention.

In addition, as a result of fertilization of tomatoes with the liquid fertilizer composition of Example 2 under the same conditions, it was confirmed that the liquid fertilizer composition of Example 2 had a significant effect on the growth of tomatoes as illustrated in FIGS. 4 and 5.

EXAMPLE 3

50 g of a residue mixture (i.e., mineral ingredient-extracted vermiculite and aqueous sulfuric acid solution) remaining after preparation of the fertilizer composition prepared according to Example 1 and from which the mineral ingredients were extracted was dried. Subsequently, the dried mixture was immersed in 70 g of water at 50° C. for 7 hours, and the immersed mixture was air-dried for 24 hours. The drying, immersion and air-drying processes were repeated three times. The air-dried mixture and the liquid fertilizer composition of Example 2 were mixed in a weight ratio of 50:50 to prepare a soil conditioner.

The prepared soil conditioner was sprayed onto acidic soil as follows: 2 kg of the soil conditioner per 300 m2 of the soil, the acidic soil was evenly mixed through tilling and left covered by plastic sheeting, and soil conditions were observed.

TABLE 2

| Test results of soil conditioner (pH of soil) | | | | | |
|---|---|---|---|---|---|
| | | After treatment | | | |
| | Before treatment | After 10 days | After 20 days | After 30 days | After 40 days |
| Spraying soil conditioner | 4.5 | 5.28 | 5.51 | 5.73 | 6.15 |

As shown in Table 2, it was confirmed that, after spraying the soil conditioner prepared according to Example 3 onto soil, pH of the soil gradually increased. Therefore, it was confirmed that the soil conditioner according to the present invention is very effective at preventing soil acidification.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present invention provides a functional fertilizer composition that is environmentally friendly, may significantly accelerate growth of plants, may be readily applied as desired by farmhouses, may reduce the amount of chemical and organic fertilizers used, may restore fertility of soil and thus soil is resistant to a variety of viruses, leading to reduction in the use of agrichemicals, which results in reduction in environmental damage according to the use of agrichemicals. In addition, a residue remaining after preparation of the functional fertilizer composition may be reused as a soil conditioner, and thus, environmental pollution due to disposal of the residue may be prevented and soil acidification may be prevented to aid crop growth. Therefore, the functional fertilizer composition has industrial applicability in the field of agriculture.

What is claimed is:

1. A functional fertilizer including natural mineral ingredients, the functional fertilizer provided in form of aqueous solution and comprising:
   an aqueous solution containing mineral ingredients extracted from a mixture of pulverized vermiculite, water, and sulfuric acid, wherein said mineral ingredients extracted from the mixture include Al, Mg, Fe, and Si; and
   at least one additive added to the aqueous solution, said at least one additive selected from the group consisting of ammonium molybdate, copper sulfate, borax or boric acid, and manganese sulfate.

2. A functional fertilizer including natural mineral ingredients, the functional fertilizer provided in form of aqueous solution and comprising:
   an aqueous solution containing mineral ingredients extracted from a mixture of pulverized vermiculite, water, and sulfuric acid, wherein said mineral ingredients extracted from the mixture include Al, Mg, Fe, and Si;
   at least one additive added to the aqueous solution, said at least one additive selected from the group consisting of ammonium molybdate, copper sulfate, borax or boric acid, and manganese sulfate; and
   at least one additional fertilizer composition subsequently added to the functional fertilizer, said at least one additional fertilizer composition selected from the group consisting of borax or boric acid, magnesium sulfate, potassium phosphate, potassium nitrate, sodium metaphosphate, distilled water, ammonium nitrate, and urea.

3. A soil conditioner comprising:
   a functional fertilizer provided in form of aqueous solution and including natural mineral ingredients extracted from a mixture of pulverized vermiculite, water, and sulfuric acid, wherein said mineral ingredients extracted from the mixture include Al, Mg, Fe, and Si, and at least one additive selected from the group consisting of ammonium molybdate, copper sulfate, borax or boric acid, and manganese sulfate; and
   a residue mixture prepared by the method comprising the steps of:
      pulverizing vermiculite;
      mixing the pulverized vermiculite with water;
      adding sulfur or sulfuric acid to the mixture of pulverized vermiculite and water;
      stirring the mixture to which sulfur or sulfuric acid has been added;
      aging the stirred mixture; and
      separating and extracting an aqueous solution containing mineral ingredients from the aged mixture.

4. The soil conditioner of claim 3, further comprising at least one additional fertilizer composition subsequently added to the functional fertilizer, said at least one additional fertilizer composition selected from the group consisting of borax or boric acid, magnesium sulfate, potassium phosphate, potassium nitrate, sodium metaphosphate, distilled water, ammonium nitrate, and urea.

* * * * *